J. Haseltine,
Horseshoe.
No. 49,028. Patented July 25, 1865.

Witnesses:

Inventor:

UNITED STATES PATENT OFFICE.

JOHN HASELTINE, OF WARREN, NEW HAMPSHIRE, ASSIGNOR TO HIMSELF AND JAS. M. WILLIAMS, OF SAME PLACE.

HORSESHOE.

Specification forming part of Letters Patent No. 49,028, dated July 25, 1865.

*To all whom it may concern:*

Be it known that I, JOHN HASELTINE, of Warren, in the county of Grafton and State of New Hampshire, have invented a new and useful Improvement in Applying Shoes to Horses' Feet; and I do hereby declare that the following is a full, clear, and exact description thereof, which will enable those skilled in the art to make and use the same, reference being had to the accompanying drawings, forming part of this specification, in which—

Figure 1:
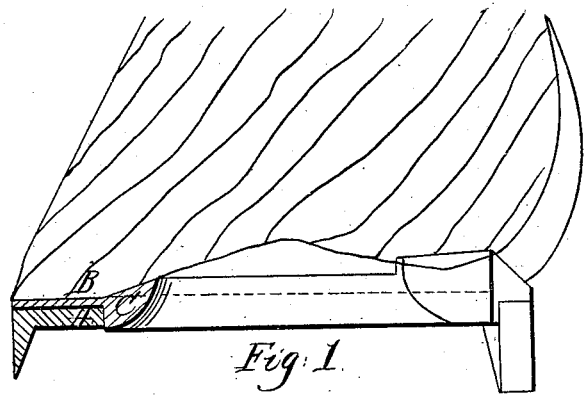
Figure 2:
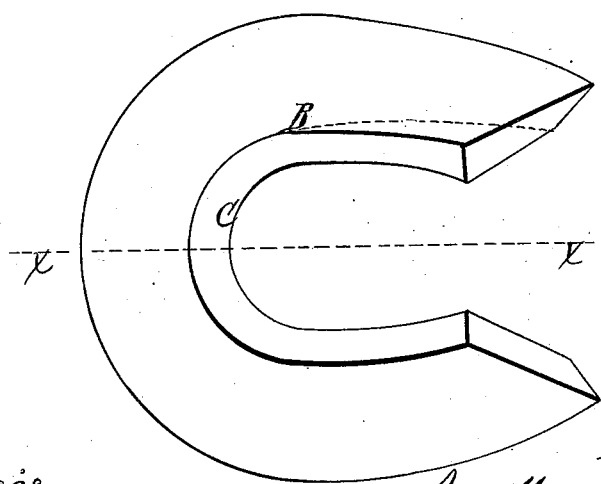

Figure 1 is a side sectional view of a shoe applied to the hoof or foot of a horse according to my invention; Fig. 2, a detached plan or top view of the same.

Similar letters of reference indicate corresponding parts.

This invention consists in applying shoes to the hoofs or feet of horses with india-rubber, either pure or combined with other substances, interposed between the shoe and the hoof or foot in such a manner that the hoof or foot is relieved from all jars or concussions, and the feet prevented from balling with snow in winter.

A represents a horseshoe, which may be constructed in the usual or in any proper manner, and B is a piece of india-rubber, either pure or combined with other substances, which is placed on the upper surface of the shoe, extending all around it and from its inner to its outer edge, and having a ridge or roll, C, at its inner edge, which is rounded or convex at its outer surface and projects upward above the top of B and also below it, the lower part of C bearing against the inner edge of the shoe and extending down so as to be flush with its under surface, as shown clearly in Fig. 1.

The shoe may be nailed to the hoof in the usual or in any proper manner, the rubber or elastic substance B being between the shoe and the hoof, while the roll or ridge C at the inner edge of the shoe fills the space between the rear or inner part of the shoe and the hoof, effectually preventing the admission of snow between the hoof and the shoe, and the consequent balling of the feet by the adhesion of snow to them during the winter season.

I do not confine myself to any particular mode of applying the rubber to the hoof, for the latter may, if desired, extend entirely across the bottom of the hoof. The important point is to have the rubber extend between the shoe and the hoof in order to avoid concussions and jars being transmitted to the hoof, and also to prevent snow passing in between the inner edge of the shoe and the bottom of the hoof, where there is always a space or opening for the snow to enter and effect a lodgment.

I consider the prevention of the balling of the foot or hoof the most essential feature of the invention, and in order to effect this it is not essential that the rubber extend entirely across the upper surface of the shoe, so long as the inner or rear part of the same between it and the hoof is effectually closed by the rubber ridge or roll C.

I claim as new and desire to secure by Letters Patent—

The employment or use of india-rubber, either pure or combined with other substances, fitted between the shoe and the hoof or foot of the animal, and provided with a ridge or roll at its inner edge, or arranged in any equivalent way, for the purpose of preventing the admission of snow between the shoe and hoof, and at the same time preventing jars or concussions being transmitted to the hoof or foot, substantially as set forth.

JOHN HASELTINE.

Witnesses:
WM. A. FLANDERS,
ELEZER SMITH.